US012245274B2

(12) United States Patent
Sun et al.

(10) Patent No.: US 12,245,274 B2
(45) Date of Patent: *Mar. 4, 2025

(54) CHANNEL OCCUPANCY TIME (COT) STRUCTURE INDICATION

(71) Applicant: QUALCOMM Incorporated, San Diego, CA (US)

(72) Inventors: Jing Sun, San Diego, CA (US); Ananta Narayanan Thyagarajan, Bangalore (IN); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/057,786

(22) Filed: Nov. 22, 2022

(65) Prior Publication Data

US 2023/0164836 A1    May 25, 2023

Related U.S. Application Data

(63) Continuation of application No. 16/829,872, filed on Mar. 25, 2020, now Pat. No. 11,516,842.

(30) Foreign Application Priority Data

Mar. 27, 2019   (IN) .............................. 201941011973
Nov. 18, 2019   (IN) .............................. 201941046921

(51) Int. Cl.
  *H04W 4/00*       (2018.01)
  *H04W 72/0446*    (2023.01)
  (Continued)

(52) U.S. Cl.
  CPC ... *H04W 74/0808* (2013.01); *H04W 72/0446* (2013.01); *H04W 72/23* (2023.01)

(58) Field of Classification Search
  CPC ............. H04W 74/0808; H04W 72/23; H04W 72/0446
  See application file for complete search history.

(56) References Cited

U.S. PATENT DOCUMENTS

| 11,516,842 B2 | 11/2022 | Sun et al. |
| 2017/0048828 A1 | 2/2017 | Um et al. |

(Continued)

FOREIGN PATENT DOCUMENTS

| CN | 107734678 A | 2/2018 |
| CN | 109156014 A | 1/2019 |
| TW | 201836375 A | 10/2018 |

OTHER PUBLICATIONS

Huawei, et al., "NR Numerology and Frame Structure for Unlicensed Bands", 3GPP TSG RAN WG1 Meeting #94, R1-1808058, 3rd Generation Partnership Project, Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 10, 2018, XP051515462, 10 pages, figures 2-6.

(Continued)

*Primary Examiner* — Siren Wei
(74) *Attorney, Agent, or Firm* — Harrity & Harrity, LLP/Qualcomm

(57) ABSTRACT

This disclosure provides systems, methods and apparatus for a user equipment (UE), operating in a shared spectrum in a connected state or an idle state, to receive a channel occupancy time structure information (COT-SI) which includes one or more of a COT duration, a COT end symbol, and a COT pause indication, in addition to slot format indication for one or more slots. Some aspects described herein define a hierarchical approach to COT structure information (COT-SI) signaling. For example, a UE may be configured with a set of short COT tables using remaining minimum system information (RMSI) signaling and may receive concatena- (Continued)

tion of COT-SI signaling identifying index values in a control channel corresponding to one or more of the set of COT tables. Based on receiving COT-SI signaling, the UE may communicate in accordance with an occurrence of a COT.

27 Claims, 7 Drawing Sheets

(51) Int. Cl.
*H04W 72/23* (2023.01)
*H04W 74/0808* (2024.01)

(56) References Cited

U.S. PATENT DOCUMENTS

| | | | |
|---|---|---|---|
| 2018/0324727 A1 | 11/2018 | Zhou | |
| 2019/0104500 A1 | 4/2019 | Reial et al. | |
| 2019/0222357 A1 | 7/2019 | Huang et al. | |
| 2020/0053782 A1* | 2/2020 | Zhang | H04L 5/0053 |
| 2020/0127796 A1 | 4/2020 | Li et al. | |
| 2020/0136882 A1* | 4/2020 | Jo | H04W 72/0446 |
| 2020/0146058 A1* | 5/2020 | Xu | H04W 72/0453 |
| 2020/0267699 A1 | 8/2020 | Zeng et al. | |
| 2020/0314902 A1 | 10/2020 | Sun et al. | |
| 2021/0153197 A1 | 5/2021 | Huang et al. | |
| 2021/0360698 A1 | 11/2021 | Xu et al. | |
| 2021/0368484 A1 | 11/2021 | Xu et al. | |
| 2022/0007361 A1 | 1/2022 | Huang et al. | |
| 2022/0060277 A1* | 2/2022 | Wei | H04L 1/0007 |
| 2022/0131725 A1* | 4/2022 | Li | H04L 5/0092 |

OTHER PUBLICATIONS

Taiwan Search Report—TW109110196—TIPO—Oct. 30, 2023.
International Preliminary Report on Patentability—PCT/US2020/024934 The International Bureau of WIPO—Geneva, Switzerland, Oct. 7, 2021.
International Search Report and Written Opinion—PCT/US2020/024934—ISA/EPO—Jul. 9, 2020.
International Search Report and Written Opinion—PCT/US2020/024934—ISA/EPO—Jul. 26, 2021.
Motorola Mobility., et al., "Feature Lead Summary for NR-U DL Signals and Channels," 3GPP Draft, 3GPP TSG RAN WG1 Meeting #96, R1-1903687, Feature Lead 7.2.2.1.2, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Mar. 3, 2019 (Mar. 3, 2019), XP051690938, 21 pages, p. 15. Proposal 2.
Nokia, et al., "On DL Signals and Channels," 3GPP Draft, 3GPP TSG RAN WG1 Meeting #96, R1-1903241, DL Signals and Channels NOK Revision, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 22, 2019 (Feb. 22, 2019), XP051600938, 16 pages, p. 3. Figure 2.
Qualcomm Incorporated: "Initial Access and Mobility Procedures for NR Unlicensed," 3GPP Draft, 3GPP TSG RAN WG1 Meeting #96, R1-1902986, 7.2.2.2.2, Initial Access and mobility Procedures FOR NR-U, 3rd Generation Partnership Project (3GPP), Mobile Competence Centre, 650, Route Des Lucioles, F-06921, Sophia-Antipolis Cedex, France, vol. RAN WG1. No. Athens. Greece; Feb. 25, 2019-Mar. 1, 2019, Feb. 16, 2019, XP051600683, 14 pages, 3 Indication of COT structure, 4 Signal for detection.
Interdigital Inc: "NR-U Frame Structure Design", 3GPP TSG RAN WG1 Meeting #95, R1-1813217, Spokane, USA, Nov. 12-16, 2018, 5 Pages.

* cited by examiner

CHANNEL OCCUPANCY TIME (COT) STRUCTURE INDICATION

CROSS-REFERENCE TO RELATED APPLICATIONS

This application is a continuation of U.S. patent application Ser. No. 16/829,872, filed Mar. 25, 2020 (now U.S. Pat. No. 11,516,842), entitled "CHANNEL OCCUPANCY TIME (COT) STRUCTURE INDICATION" which claims priority to Indian Patent Application No. 201941011973, filed on Mar. 27, 2019, and entitled "CHANNEL OCCUPANCY TIME (COT) STRUCTURE INDICATION," and to Indian Patent Application No. 201941046921, filed on Nov. 18, 2019, and entitled "CHANNEL OCCUPANCY TIME (COT) STRUCTURE INDICATION," and assigned to the assignee hereof. The contents of these applications are incorporated herein by reference in their entireties.

TECHNICAL FIELD

Aspects of the present disclosure relate generally to wireless communication, and in particular to techniques for channel occupancy time (COT) structure indication.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, from a base station (BS), a set of channel occupancy time (COT) structure indicators (COT-SIs) identifying a set of parameters of a COT for the UE; decoding, based on a state of the UE, at least one COT-SI of the set of COT-SIs to determine at least one parameter of the set of parameters of the COT; and communicating with the BS, in accordance with the at least one parameter, based on decoding the at least one COT-SI.

In some aspects, the set of COT-SIs is associated with a slot format indication (SFI) of a downlink control information (DCI) for one or more slots in the COT. In some aspects, a remaining minimum system information (RMSI) received from the BS configures, for receiving the COT-SI, at least one of a control resource set (CORESET), a search space set, a radio network temporary identifier (RNTI), a time domain monitoring occasion, or a COT table for deciphering at least part of a slot format indication in the at least one COT-SI. In some aspects, the at least one COT-SI includes an indicator identifying at least one index value for a COT table. In some aspects, the COT table includes COT structure information identifying whether a symbol or slot is within the COT or outside the COT or is subject to a COT pause.

In some aspects, the at least one COT-SI includes an explicit indication of at least one of a COT duration, a remaining COT duration, a COT end location, a pause start location, a pause end location, a current location, a traffic class, a listen-before-talk (LBT) type, or a configured grant uplink (CG-UL) parameter. In some implementations, the remaining COT duration is indicated at a granularity of at least one of: a symbol, a slot, a subframe, a multiple of symbols, a duration in seconds, or a symbol of a reference numerology. In some implementations, the reference numerology is preconfigured by a radio resource configuration or a specification. In some implementations, the reference numerology is a sub-carrier spacing for the symbol which indicates the granularity. In some implementations, the sub-carrier spacing is less than or equal to the bandwidth part sub-carrier spacing which is configured for the UE. In some implementations, the duration in seconds is preconfigured by a radio resource configuration or a specification.

In some aspects, the UE is configured to receive a downlink control information (DCI) identifying a concatenation of a plurality of table entries of a COT table from a concatenation of index values in the COT table, to indicate COT information for a plurality of slots. In some aspects, the at least one COT-SI includes an indicator identifying at least one index value for a COT table. In some aspects, the COT table includes slot format information for an entire portion of the COT.

In some aspects, receiving the at least one COT-SI includes receiving, sequentially, a plurality of COT-SIs identifying indices of a plurality of hierarchically provisioned COT tables; and communicating in accordance with a slot format configuration determined based on the plurality of COT tables. In some aspects, the UE is configured to receive information identifying a concatenation of a plurality of COT table entries of a COT table. In some aspects, the UE is configured to determine a COT structure based on a received index for the COT table and based on the concatenation of the plurality of COT table entries. In some aspects, the at least one COT-SI identifies a COT structure relating to a plurality of consecutive slots or a plurality of consecutive symbols.

In some aspects, decoding the at least one COT-SI includes decoding, in an idle state, the at least one COT-SI to determine a partial slot format configuration, and the partial slot format configuration includes at least one of a COT end symbol, a COT duration, whether a slot or symbol is within the COT, a pause start symbol, a pause end symbol, a slot level assignment, a mini-slot level assignment, or a time-division duplexing (TDD) switching pattern. In some aspects, decoding the at least one COT-SI includes decoding, in a connected state, a complete slot format configuration.

In some aspects, the method may include receiving a remaining minimum system information (RMSI) message associated with configuring at least one of one or more COT tables, a control channel monitoring configuration for the at least one COT-SI, or a description of COT-SI downlink control information (DCI) content. In some aspects, the control channel monitoring configuration for the at least one COT-SI includes at least one of a time parameter, a frequency parameter, a monitoring periodicity parameter, an offset parameter, a control resource set (CORESET) parameter, a search space set parameter, an aggregation level parameter, a control channel candidate quantity parameter, or a radio network temporary identifier (RNTI) parameter.

In some aspects, the description of the DCI content includes at least one of a DCI size parameter, a bit location parameter, a row concatenation parameter, a bits per row index parameter, a consecutive slot quantity parameter, a slot index parameter, a traffic class parameter, an acquired COT information parameter, a configured grant parameter, a multi-stage grant parameter, a random access channel (RACH) parameter, or a contention-based access parameter. In some aspects, the at least one COT-SI includes a COT pause indicator. In some aspects, the COT pause indicator identifies a duration of a COT pause or a quantity of COT pauses.

In some aspects, the COT pause indicator includes an explicit COT pause indicator or an implicit COT pause indicator. In some aspects, the at least one COT-SI is received after a start of the COT. In some aspects, the UE is configured to communicate in accordance with a stored configuration indicating that a slot format is flexibly assigned before receiving the at least one COT-SI. In some aspects, the UE is configured to monitor for the at least one COT-SI based on a stored configuration. In some aspects, an LBT type is category 2 LBT or category 4 LBT. In some aspects, an indication of the LBT type is a presence of the COT-SI.

Another innovative aspect of the subject matter described in this disclosure can be implemented in a UE for wireless communication. The UE may include memory and one or more processors operatively coupled to the memory. The memory and the one or more processors may be configured to receive, from a BS, a set of COT-SIs identifying a set of parameters of a COT for the UE; decode, based on a state of the UE, at least one COT-SI of the set of COT-SIs to determine at least one parameter of the set of parameters of the COT; and communicate with the BS, in accordance with the at least one parameter, based on decoding the at least one COT-SI.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a BS, a set of COT-SIs identifying a set of parameters of a COT for the UE; decode, based on a state of the UE, at least one COT-SI of the set of COT-SIs to determine at least one parameter of the set of parameters of the COT; and communicate with the BS, in accordance with the at least one parameter, based on decoding the at least one COT-SI.

Another innovative aspect of the subject matter described in this disclosure can be implemented in an apparatus for wireless communication. The apparatus may include means for receiving, from a BS, a set of COT-SIs identifying a set of parameters of a COT for the apparatus; means for decoding, based on a state of the apparatus, at least one COT-SI of the set of COT-SIs to determine at least one parameter of the set of parameters of the COT; and means for communicating with the BS, in accordance with the at least one parameter, based on decoding the at least one COT-SI.

Another innovative aspect of the subject matter described in this disclosure can be implemented in an apparatus for wireless communication. The apparatus may include a first interface configured to obtain a set of COT-SIs identifying a set of parameters of a COT for a UE; a second interface to decode, based on a state of the UE, at least one COT-SI of the set of COT-SIs to determine at least one parameter of the set of parameters of the COT; and a third interface to communicate in accordance with the at least one parameter, based on decoding the at least one COT-SI.

Aspects generally include a method, apparatus, system, computer program product, non-transitory computer-readable medium, user equipment, base station, wireless communication device, and processing system as substantially described herein with reference to and as illustrated by the accompanying drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
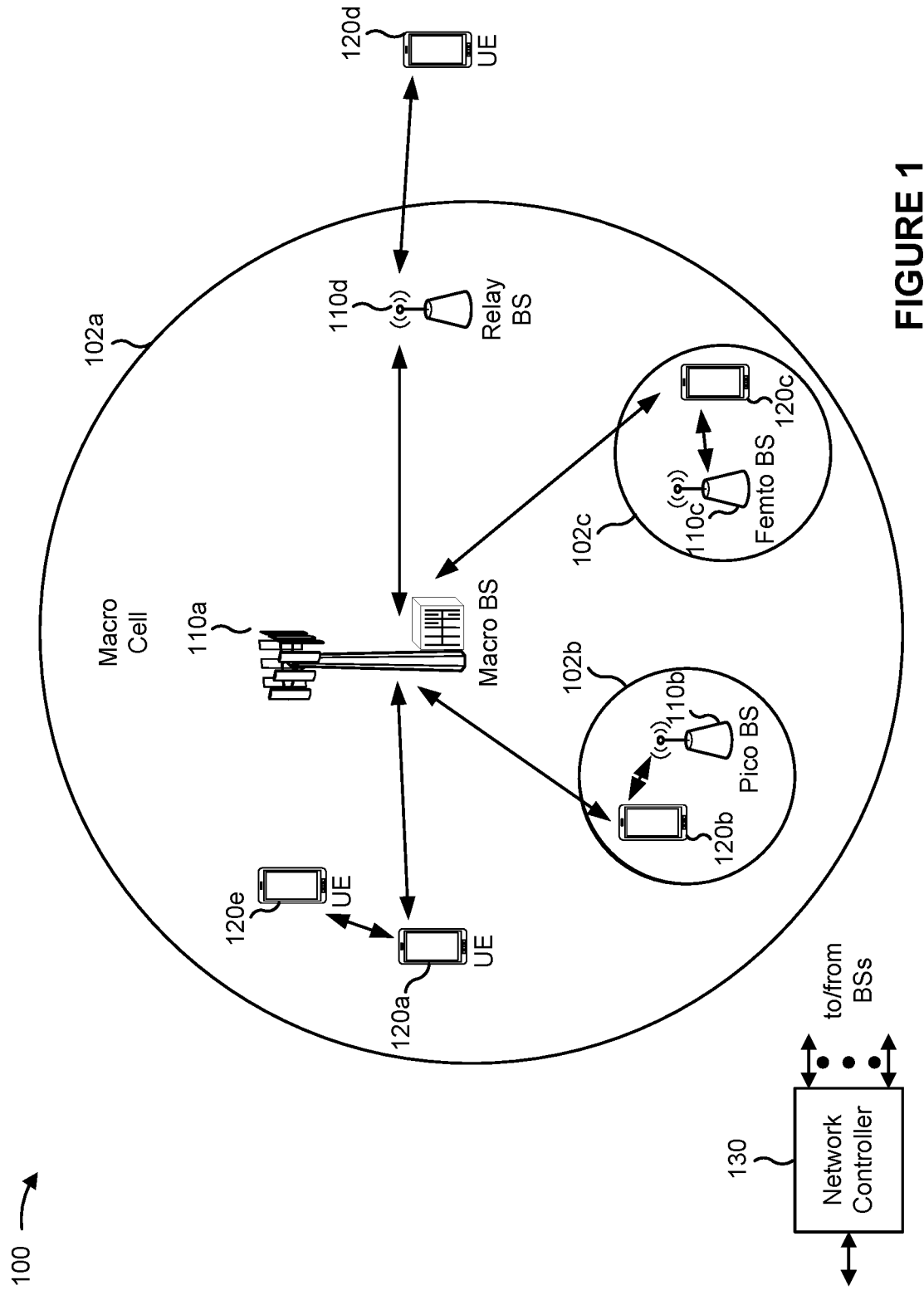
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some communications systems, such as New Radio for unlicensed spectrum (NR-U), a channel occupancy time (COT) may be defined for communications between a base station (BS) and a user equipment (UE). The UE may determine a COT structure to enable the UE to determine whether a particular resource is inside of a COT or outside of a COT. A slot format indicator (SFI) may be associated with a slot format combination table defining symbol level formats for each slot. In this case, the slot format combination table may be configured for the UE using radio resource control signaling. Each row of the slot format combination table may define slot formats for a set of consecutive slots. A downlink control information (DCI) message may convey an index value that maps to a row of the slot format combination table, thereby defining a slot format for the set of consecutive slots.

Previously, slot format indicators for NR may be used for dynamically canceling radio resource control (RRC) configured transmissions, such as periodic reference signal transmissions or configured grant uplink (CG-UL) transmissions. In NR-unlicensed spectrum deployments (NR-U), unlicensed spectrum or shared spectrum may create a need for other slot format indicator use cases not available using defined NR signaling. Additionally, a slot format indicator for NR includes detailed symbol level slot format information for all slots, which may be poorly suited to NR-U use cases. Some aspects described herein provide, for NR-U a new signaling indication for COT structure, which may include the slot format indication, which may be termed a COT structure indicator (COT-SI). In this case, COT-SI may be applicable to, for example, transmissions that are associated with a maximum COT duration.

A COT pause may be defined within a COT for NR-U. The COT pause may be one or more slots, or one or more sub-slots, that are outside of the COT but occur within a set of slots, or sub-slots, that are within the COT, thereby making the COT a non-contiguous set of slots, or sub-slots. However, a duration of the COT pause is not indicated to the UE using current signaling, thereby preventing the UE from accurately determining a COT structure of the COT. Further, in unlicensed spectrum, initial access UEs may determine resources and channel access methods or listen-before-talk (LBT) information for random access channel (RACH) signaling based on the COT structure. Based on the COT pause not being indicated using current signaling, a UE may be unable to determine channel access schemes for RRC configured uplink transmissions like CG-UL and RRC configured RACH.

Some aspects described herein define a hierarchical approach to COT-SI signaling. For example, a UE may be configured with one or two COT tables of less than a threshold size, which may be referred to as "small tables," and a control channel monitoring configuration for COT-SI using remaining minimum system information (RMSI) signaling, and may receive COT-SI signaling identifying index values corresponding to one or more of the multiple COT tables. Based on decoding the index values using the multiple COT tables, a UE may determine a COT structure, such as an occurrence of a COT pause, a COT duration, or a partial slot format indication.

Particular implementations of the subject matter described in this disclosure can be implemented to realize one or more of the following potential advantages. For example, use of hierarchical COT-SI signaling may enable the UE to operate in an NR-U communication system without excessive signaling overhead. In this way, some aspects described herein improve network performance or UE performance. Further, an initial access UE may not be able to access a COT-SI in a physical downlink control channel (PDCCH) as a result of control channel monitoring configurations being specified after UE connection using UE specific RRC. Thus, using hierarchical COT-SI for NR-U may enable an initial access UE to perform category 4 (Cat4) LBT to transmit a RACH at a configured occasion. Based on the transmission being opportunistic based on channel access, the transmission may not happen due to Cat4 LBT. However, if the UE has received information indicating that the UE is within a duration of a base station (BS) acquired COT, the UE may perform a category 2 (Cat2) LBT and transmit with an increased probability of success.

Moreover, to combat a RACH failure that may occur as a result of Cat4 LBT, a BS may be configured to statically configure multiple RACH occasions so that a UE may succeed in at least one of the RACH occasions. This may lead to inefficient usage of network resources as a BS cannot use the RACH occasions for any other communication. By using a COT-SI described herein the BS may provide additional RACH occasions by triggering a new RACH transmission after the BS acquires a COT. By including information identifying the new RACH transmission in a COT-SI, the BS enables dynamically indicated, triggered RACH, thereby improving network performance.

Further, for a CG-UL or other RRC configured uplink transmissions, a UE may use dynamic COT-SI indication described herein for channel access. For example, when inside a BS acquired COT, the UE may use Cat2 LBT or Cat4 LBT when outside COT for CG-UL. Further, an initial access UE may obtain access to a COT-SI control channel providing a monitoring configuration and COT tables described herein through the RMSI.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as the BS 110a, the BS 110b, the BS 110c, and the BS 110d) and other network entities. A BS is an entity that communicates with user equipment (UEs) and also may be referred to as a base station, a NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro the BS 110a and the UE 120d in order to facilitate communication between the BS 110a and the UE 120d. A relay station also may be referred to as a relay BS, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

The UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). the UE 120 may be included inside a housing that houses components of the UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as the UE 120*a* and the UE 120*e*) may communicate directly using one or more sidelink channels (for example, without using a BS 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the BS 110.

Figure 2:
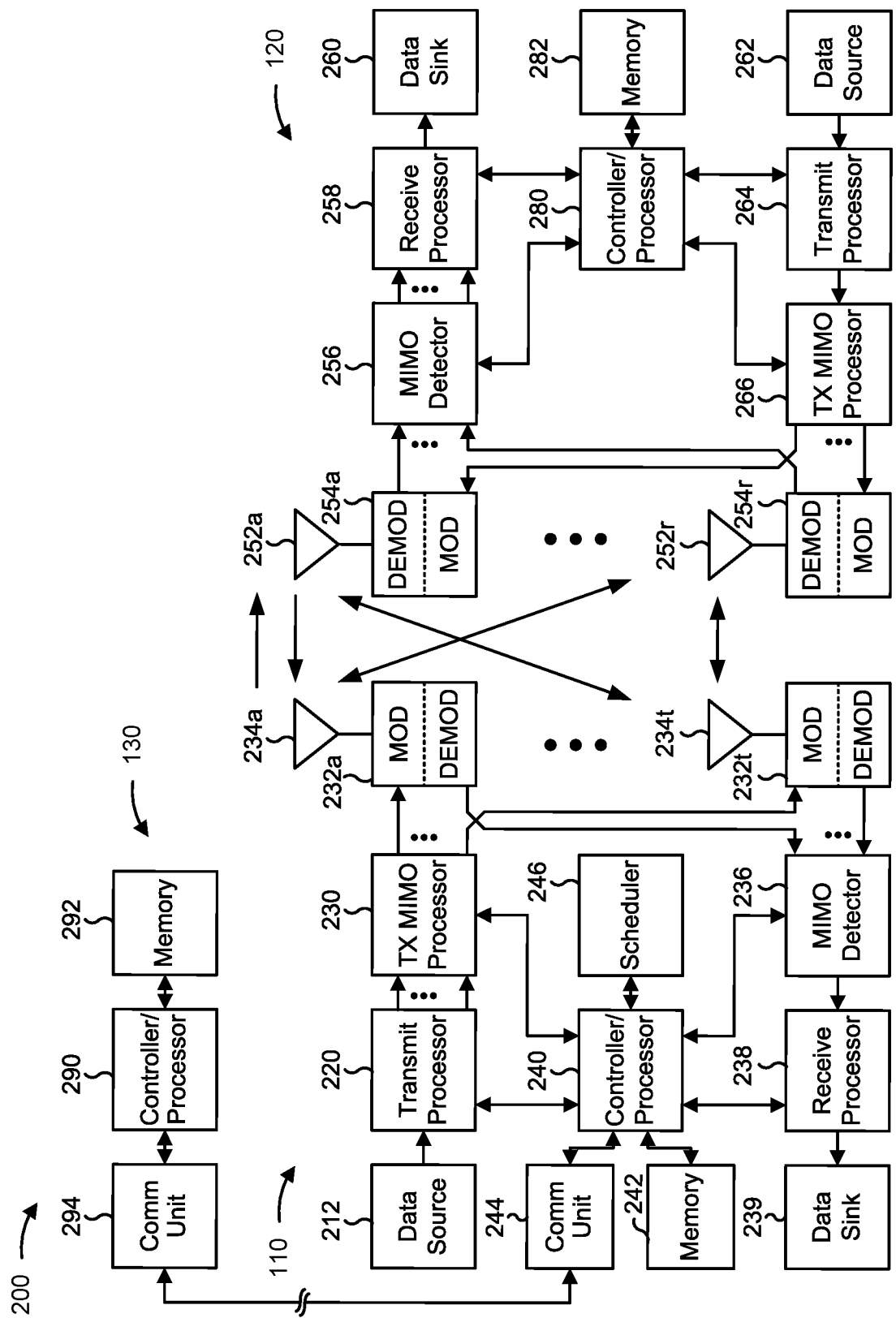
FIG. 2 is a block diagram conceptually illustrating an example of a base station (BS) in communication with a user equipment (UE) in a wireless network.

FIG. 2 is a block diagram conceptually illustrating an example 200 of a BS 110 in communication with a UE 120. In some aspects, the BS 110 and the UE 120 may respectively be one of the base stations and one of the UEs in wireless network 100 of FIG. 1. The BS 110 may be equipped with T antennas 234*a* through 234*t*, and the UE 120 may be equipped with R antennas 252*a* through 252*r*, where in general T≥1 and R≥1.

At the BS 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the BS 110 or other base stations and may provide received signals to demodulators (DE-MODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

On the uplink, at the UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from the transmit processor 264 may be precoded by a TX MIMO processor 266 if applicable, further processed by the modulators 254*a* through 254*r* (for example, for DFT-s-OFDM, CP-OFDM, etc.), and transmitted to the BS 110. At the bs 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. Receive processor 238 may provide the decoded data to a data sink 239 and the decoded control information to a controller or processor (controller/processor) 240. The BS 110 may include a communication unit 244 and communicate to the network controller 130 via a communication unit 244. The network controller 130 may include communication unit 294, a controller or processor (controller/processor) 290, and memory 292.

The controller/processor 240 of the BS 110, the controller/processor 280 of the UE 120, or any other component(s) of FIG. 2 may perform one or more techniques associated with COT structure indication, as described in more detail elsewhere herein, in an idle state, a connected state. For example, the controller/processor 240 of the BS 110, the controller/processor 280 of the UE 120, or any other component(s) (or combinations of components) of FIG. 2 may perform or direct operations of, for example, process 600 of FIG. 6 or other processes as described herein. The memories 242 and 282 may store data and program codes for the BS 110 and the UE 120, respectively. A scheduler 246 may schedule UEs for data transmission on the downlink, the uplink, or a combination thereof.

The stored program codes, when executed by controller/processor 280 or other processors and modules at the UE

Figure 6:
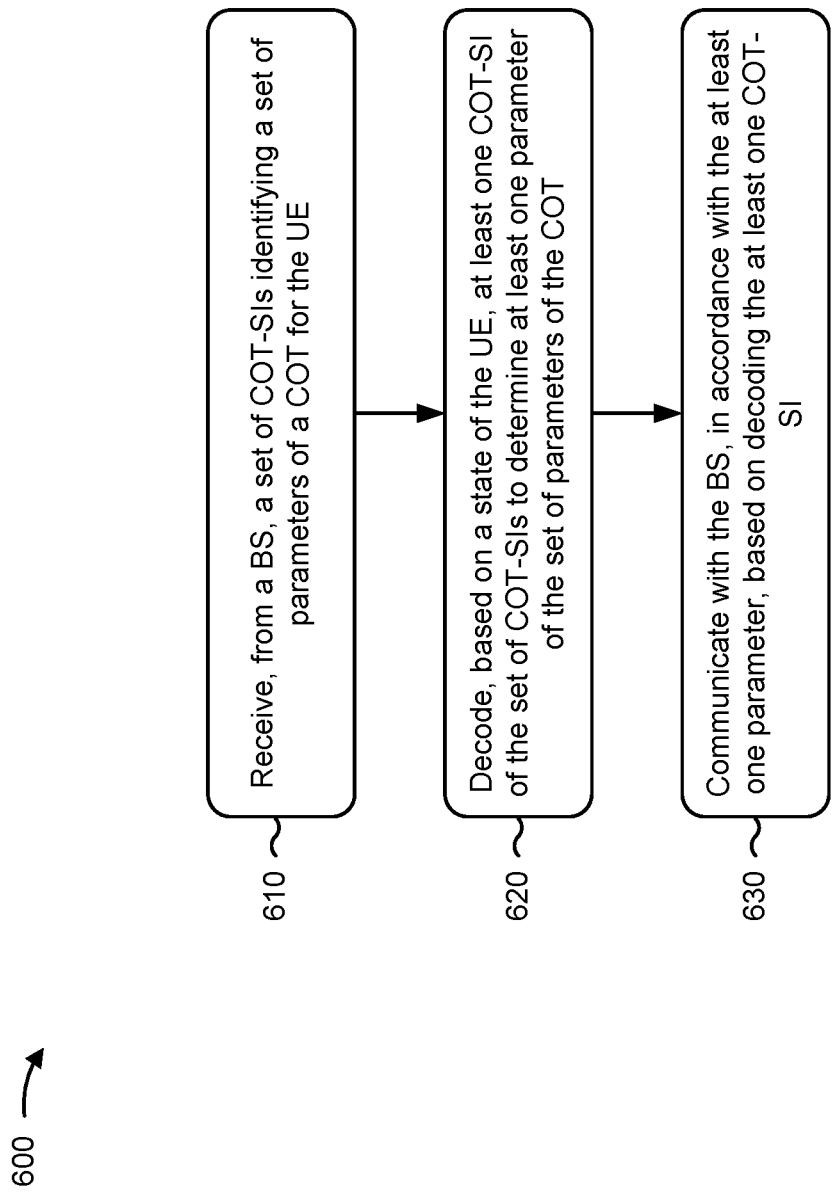
FIG. 6 is a diagram illustrating an example process performed, for example, by a UE.

120, may cause the UE 120 to perform operations described with respect to process 600 of FIG. 6 or other processes as described herein. A scheduler 246 may schedule UEs for data transmission on the downlink, the uplink, or a combination thereof.

In some aspects, the UE 120 may include means for receiving, from the BS 110 a set of channel occupancy time (COT) structure indicators (COT-SIs) identifying a set of parameters of a COT for the UE, means for decoding, based on a state of the UE, at least one COT-SI of the set of COT-SIs to determine at least one parameter of the set of parameters of the COT, means for communicating with the BS 110, in accordance with the at least one parameter, based on decoding the at least one COT-SI, or combinations thereof. For example, the UE 120 may, in an idle state, include means for receiving at least one COT-SI and may include means for using the at least one COT-SI to communicate with the BS 110. In some aspects, such means may include one or more components of the UE 120 described in connection with FIG. 2. For example, UE 120 may include a first interface providing means for obtaining a set of COT-SIs, a second interface providing means for decoding a COT-SI, a third interface providing means for communicating in accordance with a parameter of the COT-SI, or a combination thereof.

Figure 3A:
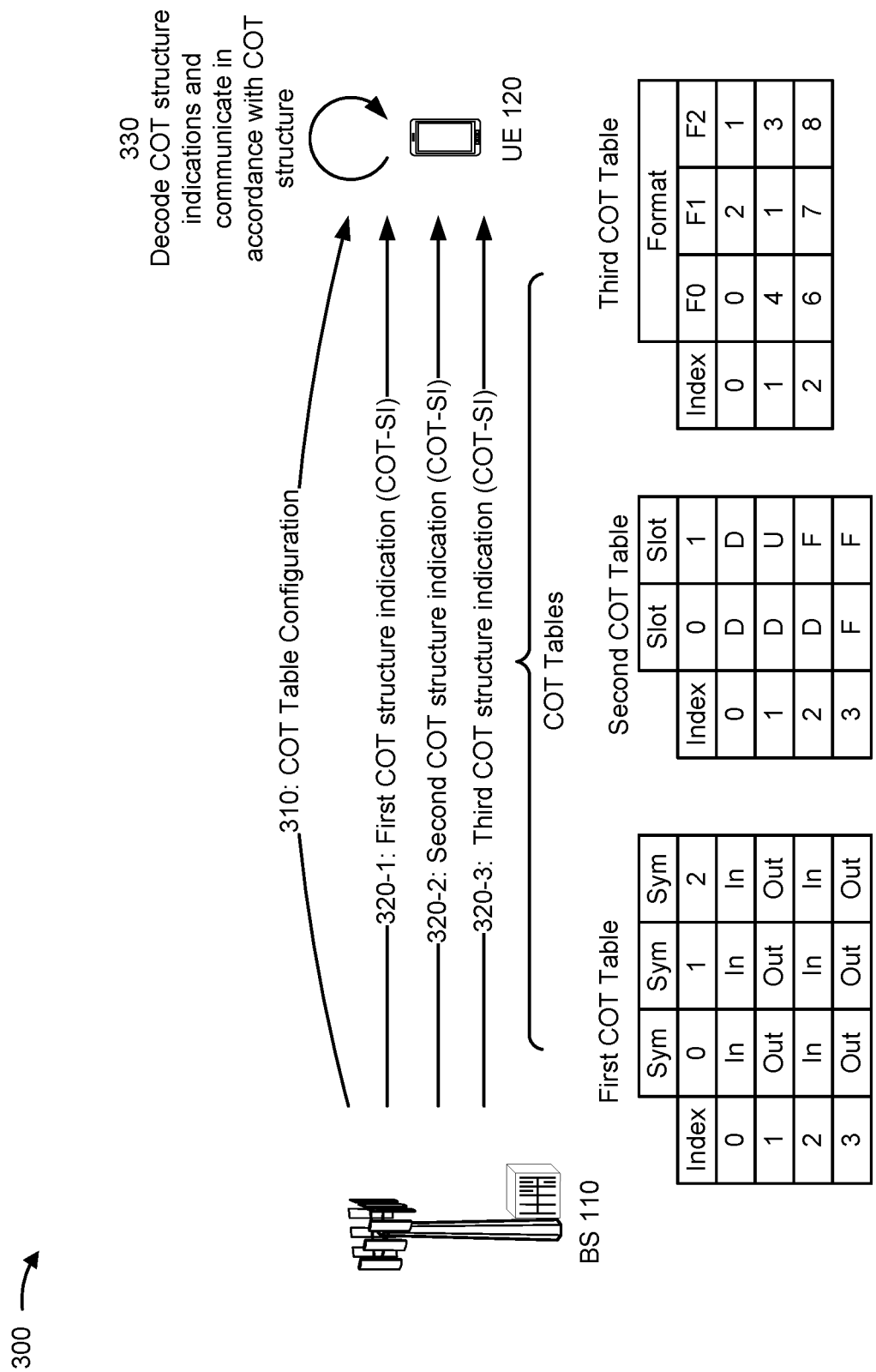
FIGS. 3A-3D are diagrams illustrating an example of channel occupancy time (COT) structure indication (COT-SI).

FIGS. 3A-3D are diagrams illustrating an example 300 and examples 350/350'/350" of channel occupancy time (COT) structure indication (COT-SI). As shown in FIG. 3A, example 300 includes a BS 110 in communication with a UE 120.

As shown in FIG. 3A, and by reference number 310, the UE 120 may receive COT table configuration information. For example, the UE 120 may receive a remaining minimum system information (RMSI) message identifying one or more small sized COT tables for use in obtaining partial COT structure information. In this case, a small sized COT table may be associated with less than a threshold size, such as less than a threshold quantity of entries or less than a threshold quantity of bits. In this case, the RMSI message may include configuration information for configuring the one or more COT tables, such as information identifying entries for the one or more COT tables or information identifying a concatenation for rows of the one or more COT tables. Additionally, alternatively, the RMSI also may include a PDCCH monitoring configuration, a DCI format for monitoring COT-SI, a size of a COT-SI PDCCH or DCI, a bit location in a DCI of information identifying a row concatenation, information identifying a quantity of bits per row index, information identifying a quantity of concatenated row indices, other bit indicators of other signaled parameters, a COT end symbol indicator, a COT pause start symbol indicator, a COT pause end symbol indicator, information relating to a triggered RACH, CG-UL information, traffic class information, LBT information, or COT acquisition information. For example, the UE 120 may determine a control resource set (CORESET), a sub-band, a wideband, a search space set, a set of aggregation levels and corresponding number of candidates, a radio network temporary identifier (RNTI), a time domain, a monitoring periodicity, a monitoring offset, a length of a downlink control information (DCI) for monitoring for a COT-SI, or a slot format indicator (SFI) DCI. In this case, an idle mode UE 120 may be able to decode COT-SI bits to indicate one or more ordered entries of a first COT table and a second COT table, as described in more detail herein. In contrast, a connected mode UE 120 may be able to decode COT-SI bits for the first COT table, the second COT table, and the third COT table.

Additionally, or alternatively, the UE 120 may determine other information regarding a COT structure. For example, when operating in an unlicensed band, the UE 120 may determine a COT duration. Additionally, or alternatively, the UE 120 may determine a concatenation of one or more rows of a COT table or a configured grant (CG) uplink (CG-UL) behavior, as described in more detail herein.

As further shown in FIG. 3A, and by reference numbers 320-1, 320-2, and 320-3, the UE 120 may receive a set of COT-SIs. For example, the UE 120 may receive a first COT-SI identifying an index value for a first COT table, a second COT-SI identifying an index value for a second COT table, or a third COT-SI identifying an index value for a third COT table. In this case, the COT-SIs may be bit indicators of a DCI received when monitoring for a PDCCH. In some aspects, the UE 120 may determine one or more parameters for communicating with the BS 110 based on the set of COT-SIs. For example, UE 120 may determine an LBT type based on whether a transmit occasion is inside or outside of an acquired COT. In another example, the COT-SI may trigger or enable a RACH occasion within the acquired COT for an idle mode UE 120 to transmit a RACH. In some aspects, the first COT-SI may include information identifying a COT end symbol, a COT duration (which may be implemented as a remaining COT duration indicator, or remaining COT duration), a first COT pause start symbol, a first COT pause end symbol, a second COT pause start symbol, or a second COT pause end symbol. In this case, the first COT-SI may explicitly identify a remaining COT duration and a COT pause indicator in a DCI. In some cases, information identifying symbol locations, such as a COT end symbol identifier, first COT pause start symbol identifier, a first COT pause end symbol identifier, a second COT pause start symbol identifier, or a second COT pause end symbol identifier, may be indicated as an offset from a current position. In some implementations, the remaining COT duration indicator can be indicated at a granularity of one or more of a symbol, a slot, a subframe, a multiple of symbols, a time duration (such as a duration in microseconds (us), milliseconds (ms) or seconds), or a symbol of a reference numerology.

In some implementations, the time duration granularity may be configured as 0.25 ms. In such implementations, a remaining COT duration indicator of 1 unit will correspond to 0.25 ms and a remaining COT duration indicator of 2 units will correspond to 0.5 ms. In some implementations, the symbol of a reference numerology granularity may be configured as a symbol at 15 kilohertz (kHz) sub-carrier spacing (SCS). In such implementations, if the UE is configured with a bandwidth part of 30 kHz SCS, the remaining COT duration indicator of 1 unit will correspond to 2 symbols for the UE at 30 kHz (since 1 symbol at 15 kHz equates to 2 symbols at 30 kHz).

In some aspects, the UE 120 may receive and decode a set of COT-SIs based on a state of the UE 120. For example, an idle mode UE 120 may decode COT-SIs for the first COT table and the second COT table and a connected mode UE 120 may decode COT-SIs for the first COT table, the second COT table, and the third COT table. In some aspects, the UE 120 may receive the COT-SIs via a single PDCCH. For example, the UE 120 may receive multiple bit indicators in a single PDCCH for multiple COT tables. Additionally, or alternatively, the UE 120 may receive the multiple bit indicators via multiple PDCCHs associated with different frequency resources, time resources, monitoring periodicities, or monitoring configurations.

In some aspects, the COT-SIs and the corresponding COT tables may be hierarchically arranged. For example, the UE 120 may receive multiple indicators relating to multiple COT tables, such as a set of three COT tables. In this case, the UE 120 may receive increasing amounts of information regarding the COT structure as additional resources are available, rather than using a relatively large single resource to signal all information regarding the COT structure.

In some aspects, the UE 120 may receive multiple COT tables in different incremental stages. For example, the UE 120 may receive the first COT table and the second COT table through an RMSI and may receive the third COT table after connecting and via a UE specific RRC message. In another example, the first COT table may be stored, and the UE 120 may receive a first part of the third COT table in the RMSI and a second part of the third COT table in a UE specific RRC after connecting. In this case, the first part of the third COT table may be the second COT table.

In some aspects, the UE 120 may determine a particular set of information regarding the COT structure based on the first COT table. For example, with regard to the first COT table, the UE 120 may determine whether each symbol in a slot is inside a COT or outside a COT without indicating whether a symbol is for uplink or downlink. In this case, a quantity of rows and entries of the first COT table may be relatively short, such as a set of 8 rows and a set of 14 columns, since the first COT table is configured through the RMSI which may be limited in size; however, the UE 120 may receive an indicator via a DCI to concatenate a set of row indices. In this way, the UE 120 is enabled to receive a single COT-SI index for the first COT table that identifies a COT structure for multiple upcoming slots. As another example, the first COT table may indicate, via a single row, whether multiple slots or symbols are inside a COT or outside a COT.

In some aspects, the UE 120 may combine the COT-SI information regarding the first COT table with other COT information received with the COT-SI or separate from the COT-SI to determine a COT structure. For example, the UE 120 may receive a COT duration indicator (which may be indicated using a remaining COT duration indicator) or a COT pause indicator in a DCI to combine with information regarding whether a particular symbol or slot is inside a COT or outside a COT. In some aspects, the COT pause indicator may indicate a start of a COT pause, a length of a COT pause, or an end of a COT pause. In some aspects, the COT pause indicator may use a particular identifier. For example, the UE 120 may interpret an outside COT indication ("0" or "Out") disposed between multiple inside COT indications ("1's" or "In's") as a COT pause indicator. Additionally, or alternatively, the UE 120 may receive an explicit COT pause indicator (which could be represented as "P" or "Pause") or a COT start symbol and end symbol identifier from which the UE 120 can derive the COT pause.

In some aspects, the UE 120 may receive a first COT-SI that explicitly includes a COT end symbol or a COT duration indicator (which may be a remaining COT duration indicator), a COT pause start symbol, and a COT end symbol. In this case, the UE 120 may not receive the first COT table.

Additionally, or alternatively, with regard to a second COT table, the UE 120 may determine whether a slot is assigned for downlink ("D"), assigned for uplink ("U"), flexibly assigned ("F"), or included in a COT pause ("0" or "P"). In this case, the second COT table provides partial slot information, such as providing one of a slot level indication, a mini-slot level indication, or a symbol-group level indication, rather than multiple levels of indication, thereby reducing resource utilization. In some aspects, the second COT table may identify a slot assignment for multiple slots with each index, but less than an entirety of a COT. In this case, the UE 120 may receive a COT-SI DCI to concatenate multiple row indices to enable signaling of a greater portion of a COT or the entirety of the COT.

In some aspects, the second COT table may be a truncation of the third COT table. For example, the second COT table may include a subset of rows of the third COT table, such as the first one or more rows. In this way, a size limit for tables configured through RMSI may be observed. In some aspects, the UE 120 may receive a COT-SI DCI for the second COT table that identifies a row that is not included in the second COT table, such as an index greater than a greatest index of the second COT table. In this case, the UE 120 may determine that a set of slots are associated with a default configured assignment, such as an unknown assignment, and the UE 120 may communicate in accordance with the default configured assignment. As another example, each row in the second COT table may include information identifying a length of a COT duration, a quantity of downlink slots, a quantity of downlink symbols, a quantity of flexible symbols, a quantity of uplink symbols, or a quantity of uplink slots.

Additionally, or alternatively, with regard to a third COT table, the UE 120 may determine an entirety of a COT structure at a symbol level. For example, the third COT table may include information identifying whether each symbol is assigned as a downlink symbol, an uplink symbol, or a flexible symbol. In some aspects, the third COT table may be a slot format combination table that identifies a slot format for symbols of an indicated quantity of consecutive slots, as shown. In some aspects, information derived from the third COT table may override information derived from the second COT table. For example, when a symbol is identified as flexibly assigned based on the second COT table, the UE 120 may determine that the flexible assignment is to be an uplink assignment based on the third COT table.

In some aspects, the UE 120 may receive other information in connection with the COT-SIs. For example, the UE 120 may receive information identifying a size of a DCI, information identifying a position of bits identifying COT table indices within a DCI, or a quantity of concatenated rows of a COT table. Additionally, or alternatively, the UE 120 may receive information identifying a current location with respect to a start of a COT, a traffic priority class of the COT, whether the BS 110 or another UE 120 acquired the COT, a dynamically triggered physical RACH (PRACH) resource information, a dynamically triggered PRACH enable or trigger message, listen-before-talk (LBT) type for the COT, a configured grant (CG) uplink (CG-UL) parameter, or a two-stage grant resource and triggering information.

Figure 3B:
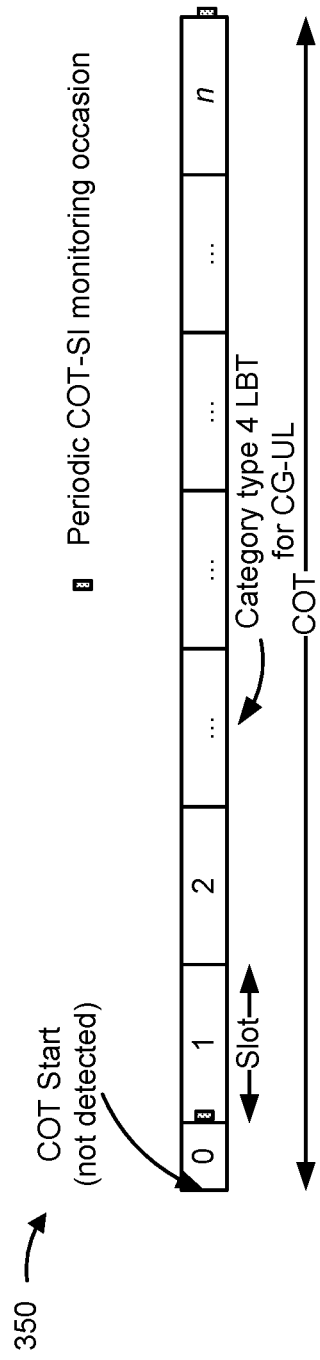

In some aspects, the UE 120 may determine a particular CG-UL behavior based on the CG-UL parameter. For example, as shown in FIG. 3B, and by example 350, the UE 120 may determine that CG-UL is allowed if a category type 4 LBT procedure is configured and a COT start is not yet detected.

In contrast, when the COT start is detected, a category type 2 LBT procedure may be configured if the transmission is within the BS acquired COT. In this case, CG-UL is allowed and a COT-SI may be detected in connection with the COT start and the category type 2 LBT procedure.

Figure 3C:
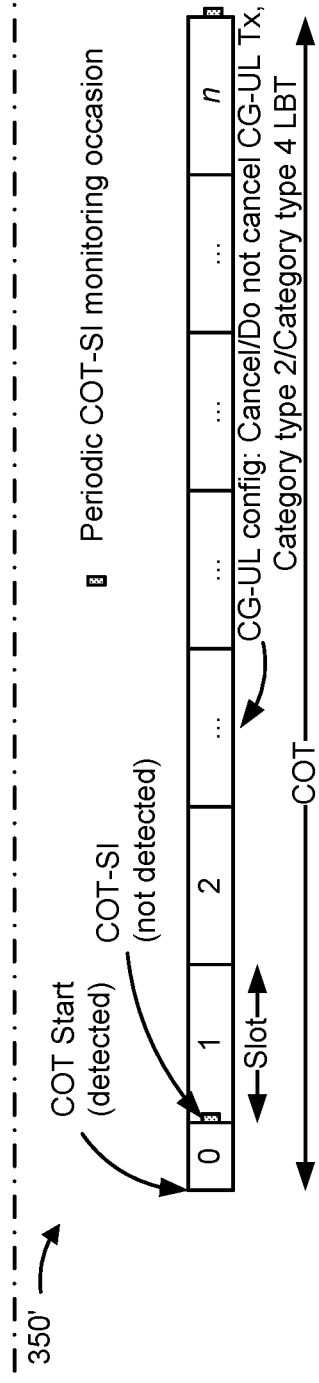

Additionally, or alternatively, as shown in FIG. 3C, and by example 350', when a COT start is detected but a COT-SI is not yet received or is not yet processed, the UE 120 may cancel a CG-UL. Additionally, or alternatively, the UE 120 may avoid canceling the CG-UL if a scheduled grant is not detected.

For example, based on a mode of a configuration of the CG-UL, if the COT-SI is not detected, the UE 120 may determine whether to cancel (in a legacy mode) or avoid canceling (in a non-legacy mode) the CG-UL. Additionally, or alternatively, the UE 120 may determine whether to use category type 4 or category 2 LBT procedure based on the configuration of the CG-UL.

Figure 3D:
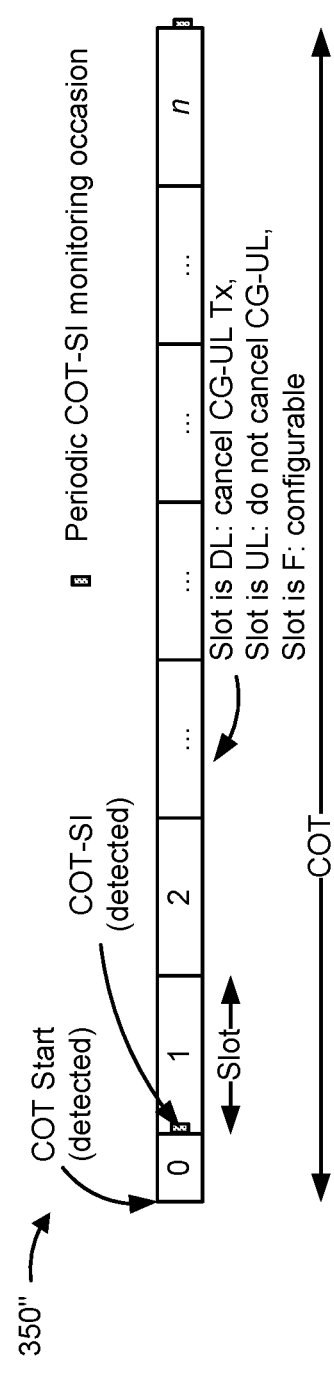

Additionally, or alternatively, as shown by FIG. 3D, and by example 350", when at a time inside a COT and a COT-SI is detected and processed by the UE 120, the UE 120 may cancel the CG-UL when a slot is assigned for downlink. Additionally, or alternatively, the UE 120 may refrain from canceling the CG-UL when the slot is assigned for uplink, and may observe a signaled behavior associated with the CG-UL parameter when the slot is assigned as flexible slot.

In this case, the UE 120 may detect a COT start and a COT-SI and may perform one or more responses based at least in part on a slot assignment direction. For example, when the COT start is detected and the COT-SI is detected, an LBT type for UL transmissions inside the COT is category type 2 LBT, but the UE 120 may cancel the CG-UL for a slot assigned to a downlink direction. In contrast, the UE 120 may forgo canceling the slot and use category type 2 LBT for channel access when the slot is assigned to an uplink direction. In some cases, when the slot is assigned as a flexible slot, the UE 120 may use a CG-UL property to determine whether to cancel or forgo canceling. Uplink signals or channels that may occur using the CG-UL may include physical uplink control channel (PUCCH) communications, configured grant physical uplink shared channel (PUSCH) communications, periodic sounding reference signal communications, semi-persistent sounding reference signal communications, physical random access channel communications, or other examples of uplink communications.

In some aspects, rather than receiving a COT-SI, the UE 120 may receive an explicit slot format indicator (SFI) for each slot of a COT. For example, the UE 120 may receive a downlink control information (DCI) conveying the explicit SFI that indicates a slot format for an entirety of the COT based on a stored table associated with an unlicensed spectrum frame structure. Based on the stored table being smaller than a slot format combination table, such as based on the unlicensed spectrum being associated with a maximum COT size of less than a threshold, a quantity of bits in the DCI to signal the COT structure is reduced. In this case, the UE 120 may determine that the DCI conveys an explicit SFI based on a bit indicator in the DCI indicating that the DCI conveys the explicit SFI rather than one or more COT-SIs. In some aspects, the DCI may signal a COT table that includes a symbol representing slots that are not within a COT. In some aspects, the DCI may include an explicit COT duration indicator to enable the UE 120 to determine the length of the COT.

Returning to FIG. 3A, and as shown by reference number 330, the UE 120 may decode one or more COT-SIs and may communicate in accordance with a COT structure identified by the one or more COT-SIs. For example, the UE 120 may determine that a slot is within a COT pause, determine when to monitor to receive information, or determine when to transmit information.

Figure 4A:
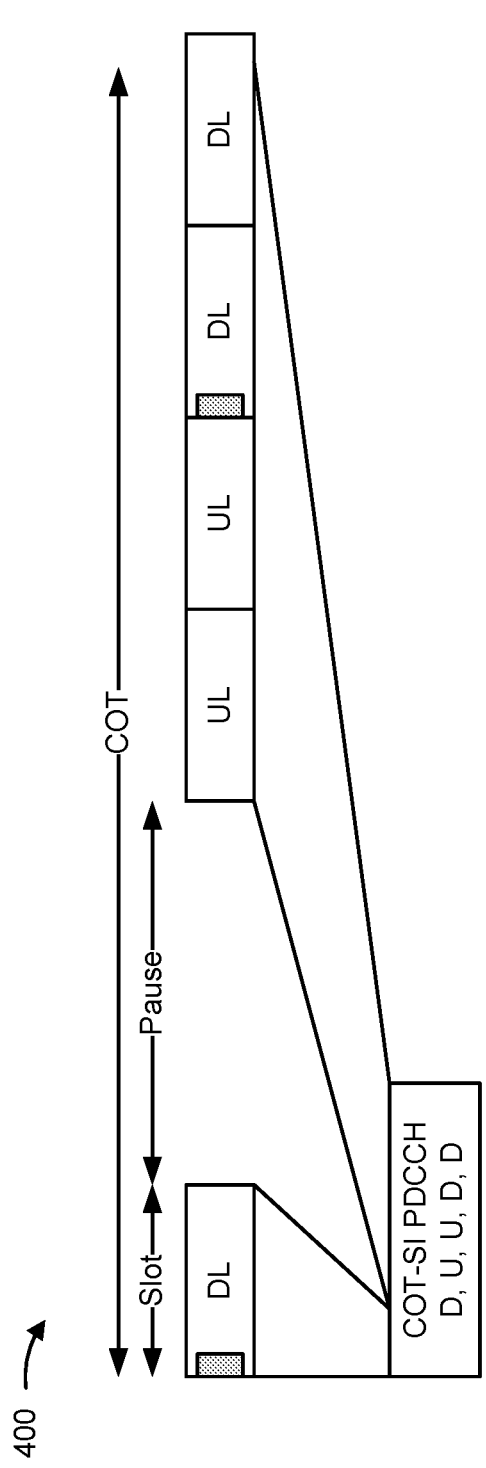
FIGS. 4A and 4B are diagrams illustrating examples of COT pause indication.
Figure 4B:
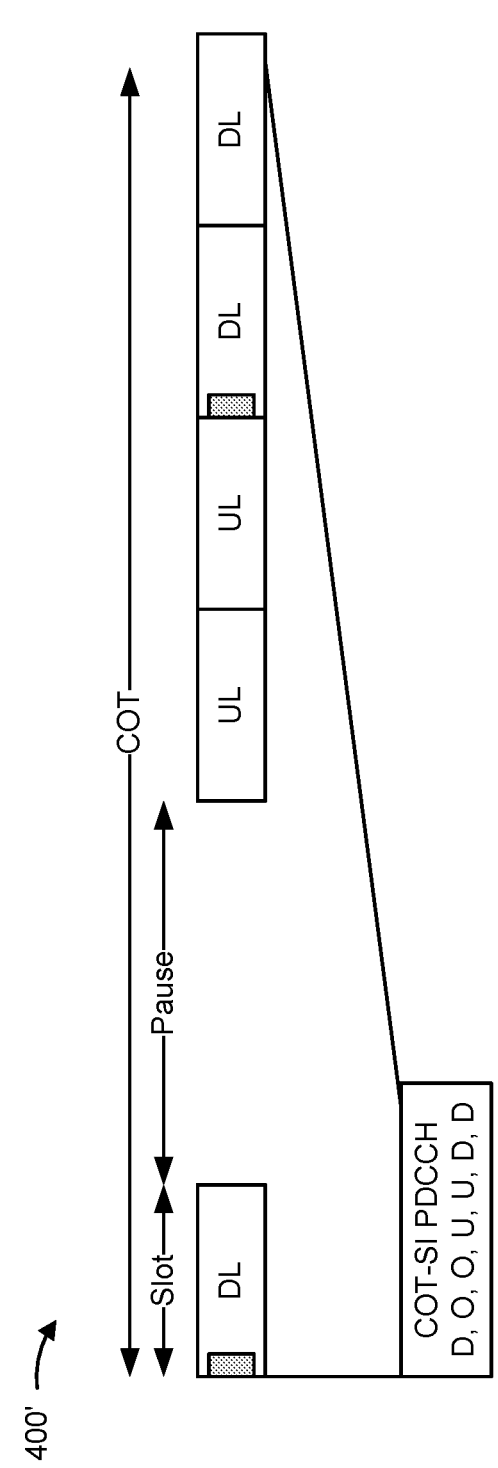

FIGS. 4A and 4B are diagrams illustrating examples 400/400' of COT pause indication.

As shown in FIG. 4A, and by example 400, a COT may include a set of slots with a COT pause disposed in one or more slots within the set of slots. As shown, a COT-SI PDCCH message may include information identifying the set of slots of the COT by identifying the set of slots as downlink slots ("D") or uplink slots ("U"). However, the COT-SI PDCCH does not identify the one or more slots of the COT pause within the set of slots. In this case, based on the COT pause indication being separately encoded and signaled to a UE, such as the UE 120, in a same DCI as the COT-SI PDCCH, the COT-SI PDCCH avoids redundancy in signaling the one or more slots of the COT pause, thereby reducing overhead in communication with the UE while still allowing the UE to determine the COT pause.

In contrast, as shown in FIG. 4B, and by example 400', another COT-SI PDCCH message may include information identifying the set of slots of the COT and identifying the one or more slots that are associated with the COT pause. For example, the COT-SI PDCCH message identifies two slots as "0, 0", which may indicate a COT pause based on the indicator "0, 0" occurring between indicators of slots that are within a COT, such as indicators "D, . . . , U, U, D, D" that surround slots "0, 0". Although some aspects are described in terms of a particular representation of the COT pause slots, other representations are possible, such as by identifying a set of flexibly assigned slots to indicate the COT pause or identifying a set of COT pause slots explicitly, as described in more detail herein.

In some aspects, a COT-SI PDCCH may identify some portions of a COT pause in COT-SI signaling and omit other portions of the COT pause in the COT-SI signaling. For example, when the COT pause is at a sub-slot level, the COT-SI signaling may omit full slots that are included in the COT pause, but may explicitly identify slots that include the COT pause in a portion of sub-slots but not an entirety of the sub-slots. Additionally, or alternatively, for COT pauses greater than a threshold length, the COT-SI signaling may omit explicit signaling of COT pause slots, but may include explicit signaling for COT pauses less than a threshold length, thereby reducing signaling overhead.

Figure 5A:
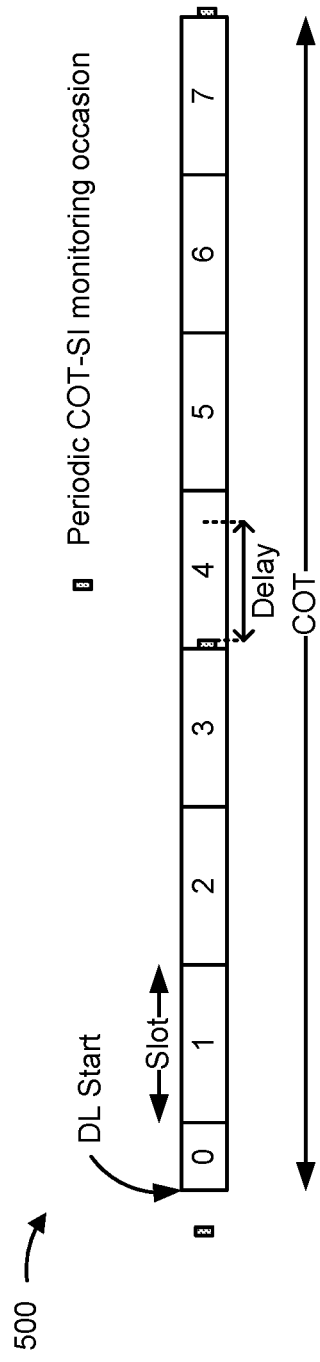
FIGS. 5A-5C are diagrams illustrating examples of physical downlink control channel (PDCCH) monitoring occasions within a COT.
Figure 5B:
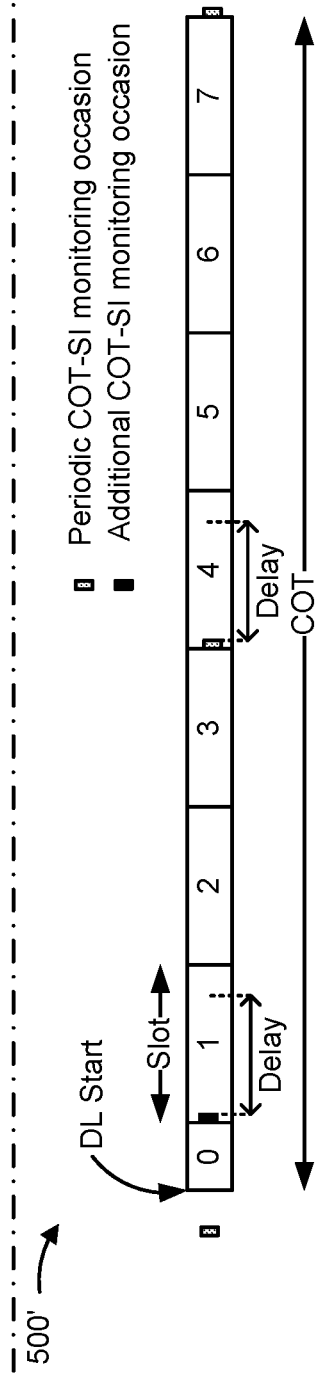
Figure 5C:
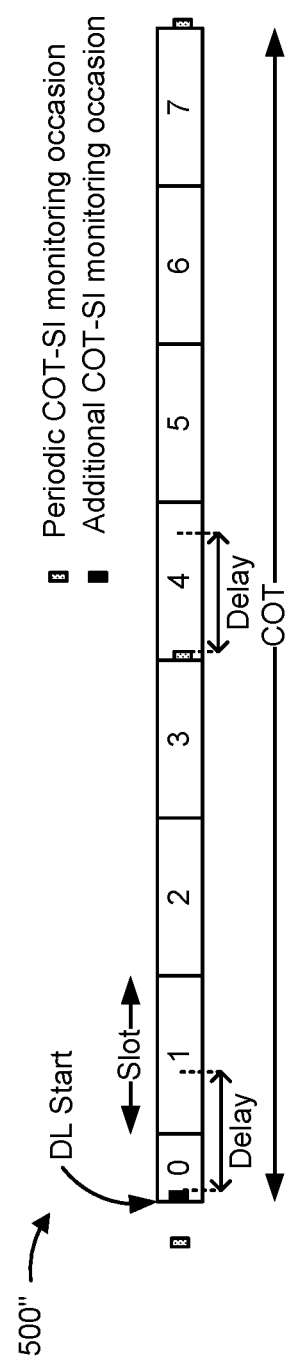

FIGS. 5A-5C are diagrams illustrating examples 500/500'/500" of physical downlink control channel (PDCCH) monitoring occasions within a COT.

As shown in FIG. 5A, and by example 500, a UE, such as the UE 120, may monitor for a periodic COT-SI PDCCH at a default RRC-configured monitoring periodicity and offset. For example, the UE may monitor for the COT-SI PDCCH before the COT start, during the COT, or after the COT, as shown.

In contrast, as shown in FIG. 5B, and by example 500', the UE may monitor for the periodic COT-SI PDCCH at a first full slot after a downlink burst start. For example, in addition to periodic COT-SI monitoring at a default RRC-configured monitoring periodicity and offset, the UE may determine to perform additional monitoring at the first slot after the downlink burst start for an aperiodic COT-SI. In this case, the UE may receive, for example, a partial COT-DCI in the first slot, such as information identifying a single index for a single COT table or two indices for two COT tables.

In further contrast, as shown in FIG. 5C, and by example 500", the UE may determine to perform the additional monitoring at a slot or partial slot after the downlink burst rather than during the first full slot. In some aspects, when the UE does not receive a COT-SI during the additional monitoring, the UE may use a default configuration for the COT. For example, the UE may determine that slots are flexibly assigned until the UE receives a COT-SI, such as at the next monitoring occasion in the fourth slot. In another example, a UE may be configured with multiple monitoring periodicities, such that a first monitoring periodicity enables more frequent monitoring than the periodic COT-SI monitoring show. In this case, the more frequent monitoring may start after the downlink burst, thereby providing multiple additional monitoring occasions.

In some aspects, a UE may determine default COT information for use from a COT start until a first COT-SI PDCCH. For example, the UE may use a default flexible assignment configuration for slots until a downlink or uplink assignment is derived from the first COT-SI PDCCH. Additionally, or alternatively, the UE may determine an unknown assignment until the first COT-SI PDCCH, and may use an RRC configuration for the COT structure until the first COT-SI PDCCH. Similarly, during a COT processing delay period, as shown, the UE may determine that slots are assigned as downlink slots. In this case, after receiving the first COT-SI PDCCH, the UE may derive the slot assignment for slots until an end of a processing delay associated with a second (next) COT-SI PDCCH, thereby avoiding an absence of an assignment during the next COT-SI PDCCH processing delay.

FIG. 6 is a diagram illustrating an example process 600 performed, for example, by a UE. The example process 600 shows where a UE, such as the UE 120, performs operations associated with COT structure indication.

As shown in FIG. 6, in some aspects, the process 600 may include receiving, from a BS a set of COT-SIs identifying a set of parameters of a COT for the UE (block 610). For example, the UE, using receive processor 258, transmit processor 264, controller/processor 280, or memory 282, may receive, from a BS, such as the BS 110, a set of COT-SIs identifying a set of parameters of a COT for the UE, as described above. In some aspects, the UE may include a first interface configured to receive the set of COT-SIs.

As shown in FIG. 6, in some aspects, process 600 may include decoding, based on a state of the UE, at least one COT-SI of the set of COT-SIs to determine at least one parameter of the set of parameters of the COT (block 620). For example, the UE, using receive processor 258, transmit processor 264, controller/processor 280, or memory 282, may decode, based on a state of the UE, at least one COT-SI of the set of COT-SIs to determine at least one parameter of the set of parameters of the COT. In some aspects, the UE may include a second interface configured to decode the at least one COT-SI to determine the at least one parameter of the COT.

As further shown in FIG. 6, in some aspects, process 600 may include communicating with the BS, in accordance with the at least one parameter, based on decoding the at least one COT-SI (block 630). For example, the UE, using receive processor 258, transmit processor 264, controller/processor 280, or memory 282, may communicate with the BS, in accordance with the at least one parameter, based on decoding the at least one COT-SI. In some aspects, the UE may include a third interface to communicate in accordance with the at least one parameter.

The process 600 may include additional aspects, such as any single implementation or any combination of aspects described below or in connection with one or more other processes described elsewhere herein.

In a first aspect, the set of COT-SIs is associated with an SFI of a DCI for one or more slots in the COT.

In a second aspect, alone or in combination with the first aspect, a RMSI received from the BS configures, for receiving the COT-SI, at least one of a CORESET, a search space set, a radio network temporary identifier (RNTI), a time domain monitoring occasion, or a COT table for deciphering at least part of a slot format indication in the at least one COT-SI. In a third aspect, alone or in combination with any one or more of the first and second aspects, the at least one COT-SI includes an indicator identifying at least one index value for a COT table. In some aspects, the COT table includes COT structure information identifying whether a symbol or slot is within the COT or outside the COT or is subject to a COT pause.

In a fourth aspect, alone or in combination with any one or more of the first through third aspects, the at least one COT-SI includes an explicit indication of at least one of a COT duration, a COT end location, a pause start location, a pause end location, a current location, a traffic class, a LBT type, or a CG-UL parameter. In a fifth aspect, alone or in combination with any one or more of the first through fourth aspects, the UE is configured to receive a DCI identifying a concatenation of a plurality of table entries of a COT table from a concatenation of index values in the COT table, to indicate COT information for a plurality of slots. In a sixth aspect, alone or in combination with any one or more of the first through fifth aspects, the at least one COT-SI includes an indicator identifying at least one index value for a COT table. In some aspects, the COT table includes slot format information for an entire portion of the COT.

In a seventh aspect, alone or in combination with any one or more of the first through sixth aspects, receiving the at least one COT-SI includes receiving, sequentially, a plurality of COT-SIs identifying indices of a plurality of hierarchically provisioned COT tables; and communicating in accordance with a slot format configuration determined based on the plurality of COT tables. In an eighth aspect, alone or in combination with any one or more of the first through seventh aspects, the UE is configured to receive information identifying a concatenation of a plurality of COT table entries of a COT table. In a ninth aspect, alone or in combination with any one or more of the first through eighth aspects, the at least one COT-SI identifies a COT structure relating to a plurality of consecutive slots or a plurality of consecutive symbols.

In a tenth aspect, alone or in combination with any one or more of the first through ninth aspects, decoding the at least one COT-SI includes decoding, in an idle state, the at least one COT-SI to determine a partial slot format configuration, and the partial slot format configuration includes at least one of a COT end symbol, a COT duration, whether a slot or symbol is within the COT, a pause start symbol, a pause end symbol, a slot level assignment, a mini-slot level assignment, or a TDD switching pattern. In an eleventh aspect, alone or in combination with any one or more of the first through tenth aspects, decoding the at least one COT-SI includes decoding, in a connected state, a complete slot format configuration.

In a twelfth aspect, alone or in combination with any one or more of the first through eleventh aspects, process 600 includes receiving a RMSI message associated with configuring at least one of one or more COT tables, a control channel monitoring configuration for the at least one COT-SI, or a description of COT-SI DCI content. In a thirteenth aspect, alone or in combination with any one or more of the first through twelfth aspects, the control channel monitoring configuration for the at least one COT-SI includes at least one of a time parameter, a frequency parameter, a monitoring periodicity parameter, an offset parameter, a CORESET parameter, a search space set parameter, an aggregation level parameter, a control channel candidate quantity parameter, or a RNTI parameter.

In a fourteenth aspect, alone or in combination with any one or more of the first through thirteenth aspects, the description of the DCI content includes at least one of a DCI size parameter, a bit location parameter, a row concatenation parameter, a bits per row index parameter, a consecutive slot quantity parameter, a slot index parameter, a traffic class parameter, an acquired COT information parameter, a configured grant parameter, a multi-stage grant parameter, a RACH parameter, or a contention-based access parameter. In a fifteenth aspect, alone or in combination with any one or more of the first through fourteenth aspects, the at least one COT-SI includes a COT pause indicator. In a sixteenth aspect, alone or in combination with any one or more of the first through fifteenth aspects, the COT pause indicator identifies a duration of a COT pause or a quantity of COT pauses.

In a seventeenth aspect, alone or in combination with any one or more of the first through sixteenth aspects, the COT pause indicator includes an explicit COT pause indicator or an implicit COT pause indicator. In an eighteenth aspect, alone or in combination with any one or more of the first through seventeenth aspects, the at least one COT-SI is received after a start of the COT. In a nineteenth aspect, alone or in combination with any one or more of the first through eighteenth aspects, the UE is configured to monitor for the at least one COT-SI based on a stored configuration. In a twentieth aspect, alone or in combination with any one or more of the first through nineteenth aspects, the UE is configured to communicate in accordance with a stored configuration indicating that a slot format is flexibly assigned before receiving the at least one COT-SI. In a twenty-first aspect, alone or in combination with any one or more of the first through twentieth aspects, the UE is configured to determine a COT structure based on a received index for the COT table and based on the concatenation of the plurality of COT table entries. In a twenty-second aspect, alone or in combination with one or more of the first through twenty-twenty-first aspects, an LBT type is category 2 LBT or category 4 LBT. In a twenty-third aspect, alone or in combination with one or more of the first through twenty-second aspects, an indication of the LBT type is a presence of the COT-SI. In a twenty-fourth aspect, alone or in combination with one or more of the first through twenty-third aspects, the LBT type is category 2 LBT based on the COT-SI indicating that a CG-UL slot is within the COT and wherein the COT is a BS-acquired COT.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

The foregoing disclosure provides illustration and description, but is not intended to be exhaustive or to limit the aspects to the precise form disclosed.

Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

As used herein, satisfying a threshold may, depending on the context, refer to a value being greater than the threshold, greater than or equal to the threshold, less than the threshold, less than or equal to the threshold, equal to the threshold, or not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   receiving information identifying a configured grant (CG) uplink (CG-UL) parameter,
      wherein CG-UL is allowed if a channel occupancy time (COT) is not yet detected;
   receiving a set of indicators identifying a set of parameters of the COT;
   decoding at least one indicator of the set of indicators to determine at least one parameter of the set of parameters of the COT,
      wherein the at least one indicator identifies a remaining COT duration at a granularity of a sub-carrier spacing reference numerology and at least one index value for a COT table, and
      wherein the COT table includes:
         slot format information for an entire portion of the COT, and
         COT structure information identifying whether a symbol or slot is within the COT or outside the COT; and
   communicating, in accordance with the at least one parameter, based on decoding the at least one indicator.

2. The method of claim 1, wherein receiving the set of indicators comprises:
   receiving, sequentially, a plurality of indicators identifying indices of a plurality of hierarchically provisioned COT tables; and
   communicating in accordance with a slot format configuration determined based on the plurality of hierarchically provisioned COT tables.

3. The method of claim 1, wherein the set of indicators is associated with a slot format indication (SFI) of a downlink control information (DCI) for one or more slots in the COT.

4. The method of claim 1, wherein the granularity is a symbol of the sub-carrier spacing reference numerology.

5. The method of claim 1, wherein receiving the set of indicators comprises:
   receiving the set of indicators in downlink control information (DCI).

6. The method of claim 1, wherein the sub-carrier spacing reference numerology is preconfigured by a radio resource configuration.

7. The method of claim 1, wherein the at least one indicator includes an indication of a COT duration.

8. The method of claim 1, wherein the set of indicators include one or more COT structure indicators (COT-SIs).

9. A user equipment (UE) for wireless communication, comprising:
   first interface configured to:
      obtain information identifying a configured grant (CG) uplink (CG-UL) parameter,
         wherein CG-UL is allowed if a channel occupancy time (COT) is not yet detected;
      obtain a set of indicators identifying a set of parameters of the COT;
   a processing system configured to:
      decode at least one indicator of the set of indicators to determine at least one parameter of the set of parameters of the COT,
         wherein the at least one indicator identifies a remaining COT duration at a granularity of a sub-carrier spacing reference numerology and at least one index value for a COT table, and
         wherein the COT table includes:
            slot format information for an entire portion of the COT,
            COT structure information identifying whether a symbol or slot is within the COT or outside the COT; and the first interface or a second interface configured to:
  communicate, in accordance with the at least one parameter, based on the at least one indicator being decoded.

10. The UE of claim 9, wherein the first interface, to obtain the set of indicators, is configured to:
  obtain, sequentially, a plurality of indicators identifying indices of a plurality of hierarchically provisioned COT tables; and
  communicate in accordance with a slot format configuration determined based on the plurality of hierarchically provisioned COT tables.

11. The UE of claim 9, wherein the set of indicators is associated with a slot format indication (SFI) of a downlink control information (DCI) for one or more slots in the COT.

12. The UE of claim 9, wherein the granularity is a symbol of the sub-carrier spacing reference numerology.

13. The UE of claim 9, wherein the first interface, to obtain the set of indicators, is configured to:
  obtain the set of indicators in downlink control information (DCI).

14. The UE of claim 9, wherein the sub-carrier spacing reference numerology is preconfigured by a radio resource configuration.

15. The UE of claim 9, wherein the at least one indicator includes an indication of a COT duration.

16. The UE of claim 9, wherein the set of indicators include one or more COT structure indicators (COT-SIs).

17. An apparatus of a network entity for wireless communication, comprising:
  an interface configured to:
    output information identifying a configured grant (CG) uplink (CG-UL) parameter,
      wherein CG-UL is allowed if a channel occupancy time (COT) is not yet detected;
    output a set of indicators identifying a set of parameters of the COT,
      wherein at least one indicator of the set of indicators is configured to be decoded to determine at least one parameter of the set of parameters of the COT,
      wherein the at least one indicator identifies a remaining COT duration at a granularity of a sub-carrier spacing reference numerology and at least one index value for a COT table, and
      wherein the COT table includes:
        slot format information for an entire portion of the COT,
        COT structure information identifying whether a symbol or slot is within the COT or outside the COT; and
    communicate, in accordance with the at least one parameter, based on the at least one indicator being decoded.

18. The apparatus of claim 17, wherein the interface, to output the set of indicators, is configured to:
  output, sequentially, a plurality of indicators identifying indices of a plurality of hierarchically provisioned COT tables; and
  communicate in accordance with a slot format configuration determined based on the plurality of hierarchically provisioned COT tables.

19. The apparatus of claim 17, wherein the set of indicators is associated with a slot format indication (SFI) of a downlink control information (DCI) for one or more slots in the COT.

20. The apparatus of claim 17, wherein the granularity is a symbol of the sub-carrier spacing reference numerology.

21. The apparatus of claim 17, wherein the interface, to output the set of indicators, is configured to:
  output the set of indicators in downlink control information (DCI).

22. The apparatus of claim 17, wherein the sub-carrier spacing reference numerology is preconfigured by a radio resource configuration.

23. The apparatus of claim 17, wherein the at least one indicator includes an indication of a COT duration.

24. The apparatus of claim 17, wherein the set of indicators include one or more COT structure indicators (COT-SIs).

25. A method of wireless communication performed by an apparatus of a network entity, comprising:
  outputting information identifying a configured grant (CG) uplink (CG-UL) parameter,
    wherein CG-UL is allowed if a channel occupancy time (COT) is not yet detected;
  outputting a set of indicators identifying a set of parameters of the COT, at least one indicator of the set of indicators being decoded to determine at least one parameter of the set of parameters of the COT,
    wherein the at least one indicator identifies a remaining COT duration at a granularity of a sub-carrier spacing reference numerology and at least one index value for a COT table, and
    wherein the COT table includes:
      slot format information for an entire portion of the COT,
      COT structure information identifying whether a symbol or slot is within the COT or outside the COT; and
  communicating, in accordance with the at least one parameter, based on the at least one indicator being decoded.

26. The method of claim 25, wherein outputting the set of indicators comprises:
  outputting, sequentially, a plurality of indicators identifying indices of a plurality of hierarchically provisioned COT tables; and
  communicating in accordance with a slot format configuration determined based on the plurality of hierarchically provisioned COT tables.

27. The method of claim 25, wherein the set of indicators include one or more COT structure indicators (COT-SIs).

* * * * *